US011763359B2

(12) United States Patent
Laprade et al.

(10) Patent No.: US 11,763,359 B2
(45) Date of Patent: Sep. 19, 2023

(54) INVOICE NUMBERING

(71) Applicant: STRIPE, INC., San Francisco, CA (US)

(72) Inventors: David Laprade, Wilmington, DE (US); Jamie Kite, Durham, NC (US); Piyush Poddar, New York, NY (US)

(73) Assignee: STRIPE, INC., San Francisco, CA (US)

( * ) Notice: Subject to any disclaimer, the term of this patent is extended or adjusted under 35 U.S.C. 154(b) by 127 days.

(21) Appl. No.: 17/143,891

(22) Filed: Jan. 7, 2021

(65) Prior Publication Data

US 2022/0215447 A1   Jul. 7, 2022

(51) Int. Cl.
| | |
|---|---|
| *G06Q 30/04* | (2012.01) |
| *G06F 16/22* | (2019.01) |
| *G06F 16/215* | (2019.01) |
| *G06Q 40/12* | (2023.01) |
| *G06F 16/248* | (2019.01) |
| *G06Q 20/08* | (2012.01) |

(52) U.S. Cl.
CPC .......... *G06Q 30/04* (2013.01); *G06F 16/215* (2019.01); *G06F 16/2228* (2019.01); *G06F 16/248* (2019.01); *G06Q 20/085* (2013.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 7,805,706 B1 * | 9/2010 | Ly | ........................ | G06F 9/5083 |
| | | | | 717/124 |
| 2018/0101563 A1 * | 4/2018 | Yang | ................... | G06F 16/2365 |

FOREIGN PATENT DOCUMENTS

| | | | | | |
|---|---|---|---|---|---|
| CN | 104252545 A | * | 12/2014 | ......... | G06F 16/2336 |
| JP | H06203049 A | * | 7/1994 | ............. | G06F 15/21 |
| JP | 2022501752 A | * | 1/2022 | | |
| WO | WO-9933016 A1 | * | 7/1999 | ......... | G06Q 30/0601 |
| WO | WO-2008108861 A1 | * | 9/2008 | ............. | G06Q 40/02 |

* cited by examiner

*Primary Examiner* — Ariel J Yu
(74) *Attorney, Agent, or Firm* — Womble Bond Dickinson (US) LLP

(57) ABSTRACT

Methods and apparatuses for invoice numbering are disclosed. In one embodiment, the method comprises A method for electronically generating invoices for a party with invoice numbers where there are no gaps between invoice numbers nor duplicate invoice numbers, the method comprising: receiving, at a database, a first request to prepare an invoice for the party; preparing the invoice, including calling a command to assign an invoice number to the invoice; acquiring a limited-time lock to cause any other requests to the database related to obtaining invoice numbers for invoices for the party to wait until the invoice number has been assigned and persisting the invoice to the database has completed; assigning the invoice number for the invoice after confirming a highest invoice number already stored in the database, where the invoice number is assigned the number that is next sequentially to the highest invoice number; after assigning a number to the invoice, then persisting the invoice with the assigned invoice number to the database; and releasing the lock in response to completely persisting the invoice with the assigned invoice number to the database.

22 Claims, 7 Drawing Sheets

INVOICE NUMBERING

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD

Embodiments of the present invention relate to the field of systems for processing commercial transactions; more particularly, embodiments of the present invention relate to generating and processing invoices for transactions.

BACKGROUND

Today, many merchants use third parties to handle all their payment processing needs for commercial transactions. In some cases, the merchants redirect their customers to the third party, who is responsible for capturing the payment information and processing the transaction, or the merchants capture payment information themselves from their customers and send it to a third-party payment gateway for real-time authorization of transactions and subsequent settlement of funds.

As part of processing some transactions, some third-party payment gateways generate invoices on behalf of the merchants. To satisfy tax compliance for some jurisdictions, the invoices generated for individual merchants are required to have invoice numbers that are assigned sequentially (without gaps) and that are not duplicates (i.e., the invoice numbers are unique). One fundamental problem in meeting these requirements with some third-party payment gateways is that known approaches to sequential assignment (e.g. Two Phase Commit Protocols) take two database writes in order to number an invoice: (i) a write that saves the number to the actual invoice in the database, and (ii) a write that saves a log of the invoice number, so that it can be checked for uniqueness. Depending on the implementation, (ii) might precede (i), or (i) might precede (ii). In such a two-step system, a successful write to the log (ii) is taken as a kind of proof that it is safe to write the number to the invoice (i)—a way of reserving a number for an invoice. This approach is problematic, however, because if either database write fails, the system could create an invoice with either a duplicate number, or a gap in numbers. If the invoice saves (i) without saving to the log and reserving the number for the invoice (ii), then duplicate invoice numbers will occur; if the log is written to and a number is reserved (ii) but the invoice does not save (i), then gaps will result between invoice numbers.

The likelihood that one of these writes will fail is increased when the system is distributed (i.e. running on a large number of computers operating simultaneously), and when a large number of invoices is being created by the system at the same time. The latter happens, for example, when issuing invoices for subscription services. In subscription services, invoices are created automatically on a recurring basis. In some instances, because of the subscriptions, invoices may be generated at the same time (e.g., the first of each month), causing a very large number of invoices to be created by the third-party payment gateway in a very short period of time. This may cause some issues, particularly when a multi-write system is generating the invoices. These include:
1) the first database write can succeed while the second database write fails, e.g.
   a. the process crashes between database writes so that the second write is never attempted,
   b. there is a database connection issue for only one of the writes
2) there can be a long time between database writes, e.g.
   a. it takes a long time to connect to the database on the first write but not the second
3) there can be a massive spike in invoice creation all at once
   a. this could result in competing processes pausing execution to wait for the next number, potentially adding a substantial amount of latency and leading to timeout errors.

It is desirable to avoid these situations while meeting the tax compliance requirements of various jurisdictions.

SUMMARY

Methods and apparatuses for invoice numbering are disclosed. In one embodiment, the invoice numbering is associated with commercial transactions involving a payment processor.

In one embodiment, the method comprises A method for electronically generating invoices for a party with invoice numbers where there are no gaps between invoice numbers nor duplicate invoice numbers, the method comprising: receiving, at a database, a first request to prepare an invoice for the party; preparing the invoice, including calling a command to assign an invoice number to the invoice; acquiring a limited-time lock to cause any other requests to the database related to obtaining invoice numbers for invoices for the party to wait until the invoice number has been assigned and persisting the invoice to the database has completed; assigning the invoice number for the invoice after confirming a highest invoice number already stored in the database, where the invoice number is assigned the number that is next sequentially to the highest invoice number; after assigning a number to the invoice, then persisting the invoice with the assigned invoice number to the database; and releasing the lock in response to completely persisting the invoice with the assigned invoice number to the database.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
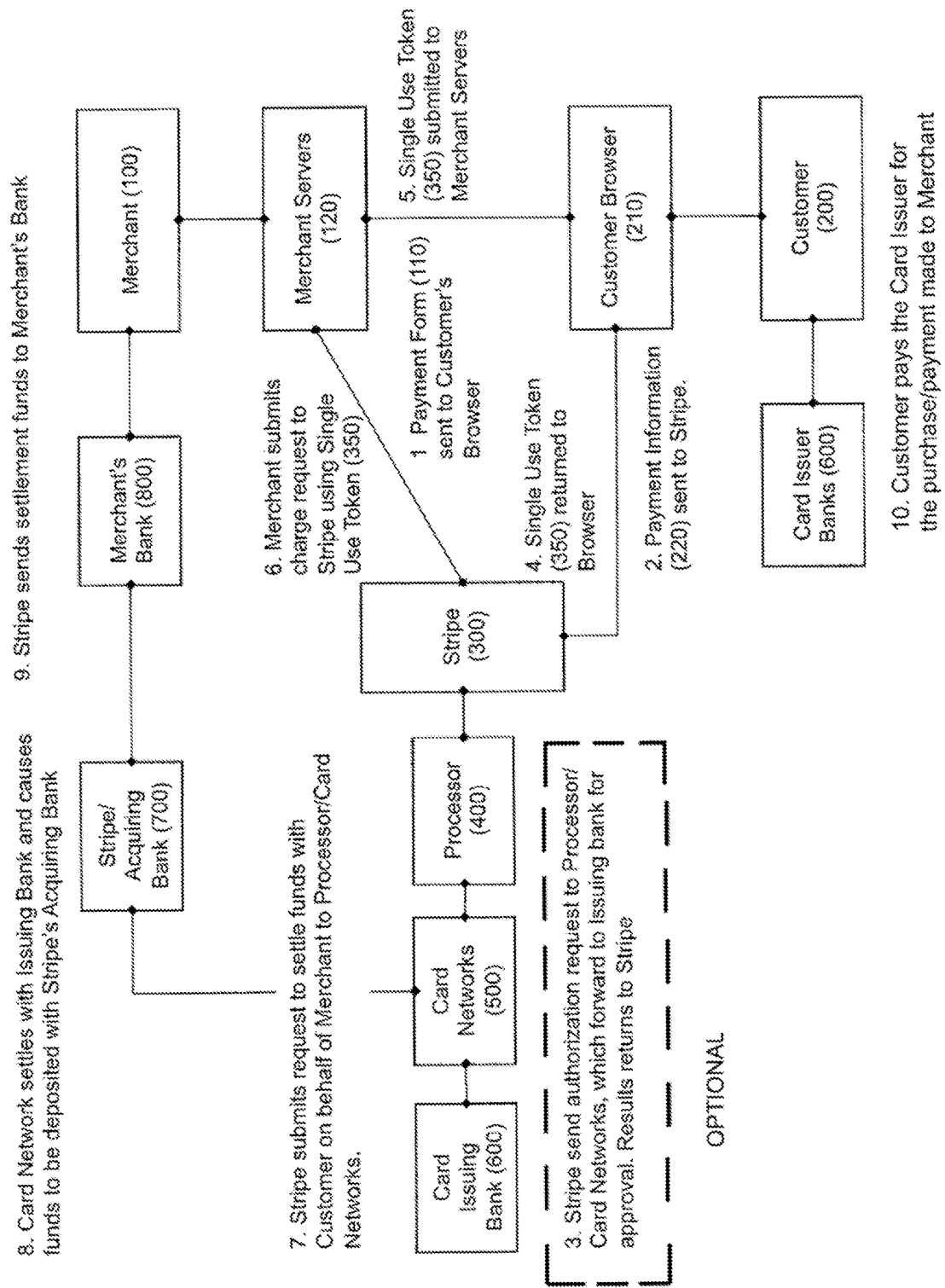
FIG. 1 shows a flow diagram of the steps and entities for implementing payment processing.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Certain terminology is used herein for convenience only and is not to be taken as a limitation on the present invention.

Embodiments of the present invention are described in the context of an online payment acceptance service called Stripe® commercialized by Stripe, Inc., San Francisco, Calif.

The following definitions are provided to promote understanding of the present invention.

Card Network (or Card Association)—refers to financial payment networks such as Visa®, MasterCard®, American Express®, Diners Club®, JCB® and China UnionPay®.

Processor—A processor is a company (often a third party) appointed to handle credit card transactions. They have connections to various card networks and supply authorization and settlement services to merchants or payment service providers. They can also move the money from the issuing bank to the merchant or acquiring bank.

Acquiring Bank—An acquiring bank (or acquirer) is the bank or financial institution that accepts credit and or debit card payments from affiliated card networks for products or services on behalf of a merchant or payment service provider.

Card Issuing Bank—A card issuing bank is a bank that offers card network or association branded payment cards directly to consumers. The issuing bank assumes primary liability for the consumer's capacity to pay off debts they incur with their card.

Payment Information—In one embodiment for making payment via a credit card or debit card, the payment information includes primary account number (PAN) or credit card number, card validation code, expiration month and year. In another embodiment for making payment via an Automated Clearinghouse (ACH) transaction, the payment information includes a bank routing number and an account number within that bank. The payment information includes at least some sensitive, non-public information.

Merchant—A merchant, as used herein, is an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

Merchant Site—The merchant site is the e-commerce site (e.g., website) of the merchant. The merchant (100) and merchant server (120) in the figures are associated with the merchant site. The merchant site is associated with a client-side (client side) application and a server-side (server side) application. In one embodiment, the merchant site includes Merchant Server (120), and the server-side application executes on the Merchant Server (120).

Customer's Electronic Device—This is the device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native application (app) installed onto the customer's device. The client-side application executes on the customer's electronic device.

Payment Processor—A payment processor, as referred to herein, is an entity or a plurality of entities that facilitate a transaction between a merchant site and a customer's electronic device. The payment processor includes selected functionality of both Stripe (300) and Processor (400)/Card Networks (500). For example, in one embodiment, Stripe (300) creates tokens and maintains and verifies publishable (non-secret) keys and secret keys in a manner well-known in the art. See for example, U.S. Pat. Nos. 10,134,036, 9,830, 596, and 9,824,354. The Processor (400)/Card Networks (500) is involved in authorizing or validating payment information. In one embodiment, Stripe (300) and the Processor (400)/Card Networks (500) function together to authorize and validate payment information, issue a token, and settle any charges that are made. Accordingly, in one embodiment, the payment processor refers to the functionality of Stripe (300) and the functionality of the Processor (400)/Card Networks (500). In another preferred embodiment wherein step 3A in the high-level description is not performed, and Stripe (300) performs its own verification before issuing a token, the Processor (400)/Card Networks (500) are still used for settling any charges that are made, as described in step 7A in the high-level description. Accordingly, in this embodiment, the payment processor may refer only to the functionality of Stripe (300) with respect to issuing tokens.

Native Application—A Native Application or "native app" is an application commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real-time to run, and also differs from a Web application that is run within the browser.

Overview

Techniques are disclosed herein for generating invoices for commercial transactions. In one embodiment, the invoice numbers for invoices are issued without any gaps between invoice numbers and without duplicate numbers (i.e., no two invoices have the same number). In one embodiment, the invoice numbers are issued for invoices according to two different invoice-numbering patterns. In one embodiment, the two different invoice-numbering patterns include issuing invoice numbers sequentially across each customer of a merchant and issuing invoice numbers sequentially across the whole account of customers of the merchant. In one embodiment, the invoices are generated and sent by a payment processor (e.g., Stripe) on behalf of a merchant as part of a transaction involved in the payment processing flow.

FIG. 1 shows a flow diagram of the steps and entities for implementing payment processing flow embodiments of the present invention.

At a high level, the payment processing framework described herein works as follows (FIG. 1).

1. A Merchant's Customer (200) uses an internet-enabled browser (210) to visit the Merchant's site. In one embodiment, Customer (200) is served a Stripe.js enabled Payment Form (110) using standard web technologies. Stripe.js is well-known in the art. For more information on Stripe.js, see U.S. Pat. Nos. 10,134,036, 9,830,596, and 9,824,354. The Customer (200) enters the necessary information including their Payment Information (220) and submits the Payment Form (110). The Billing Info portion of the Payment Form (110) is for payment via a credit card or debit card. If payment is to be made via an Automated Clearinghouse (ACH) transaction, the Billing Info portion of the Payment Form (110) will request a bank routing number and an account number within that bank, and possibly additional information, such as the bank name and whether the account is a checking or savings account.

2. The Customer's payment information (220) is sent from the Customer's browser (210) to Stripe (300), never touching the Merchant's Servers (120). In this manner, the client-side application electronically sends payment information retrieved from the customer's electronic device to the payment processor. The client-side application does not send the payment information (220) to the server-side application.

3. In one embodiment, Stripe (300) submits the relevant transaction to a Processor (400) or directly to the Card Network (500) for authorization or validation of the payment information. The Card Network (500) sends the request to the Card Issuing Bank (600), which authorizes the transaction. In this embodiment, Stripe (300) and Processor (400)/Card Network (500) function together as a payment processor. In another embodiment, this step is performed without any communication to the Processor (400)/Card Network (500). Instead, Stripe (300) performs its own authorization or validation of the payment information using heuristic means, such as by checking the Bank Identification Number (BIN), also referred to as the Issuer Identification Number (IIN), against a database of known valid BINs that is on file with Stripe (300). (The BIN is a part of the bank card number, namely the first six digits.) In yet another embodiment, this step is not performed at all since the authorization or validation is not necessary for the next step 4 to succeed. That is, it is acceptable to create a Single-use Token in step 4A that represents payment information which has not been validated in any way.

4. If authorized, Stripe (300) will generate and return a secure, Single-use Token (350) to the Customer's Browser (210) that represents the customer's payment information (220) but doesn't leak any sensitive information. In the embodiment wherein step A3 is not performed, Stripe (300) performs this step without waiting to receive authorization from the Processor (400) or the Card Network (500). In this manner, the payment processor (here, Stripe (300)) creates the Token (350) from the payment information sent by the client-side application, wherein the Token (350) functions as a proxy for the payment information (220).

5. The Payment Form (110) is submitted to Merchant's Servers (120), including the Single-use Token (350). More specifically, the payment processor sends the Token (350) to the client-side application, which, in turn, sends the Token (350) to the server-side application for use by the server-side application in conducting the transaction.

6. The Merchant (100) uses the Single-use Token (350) to submit a charge request to Stripe (or to create a Customer object for later use). In this step, Stripe (300) submits a request to authorize the charge to the Processor (400) or directly to the Card Network (500). This authorization specifies the actual amount to charge the credit card. If an authorization was already done in step 3A for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1-6, the payment information can be used by the server-side application via the Token (350) without the server-side application being exposed to the payment information.

7. Stripe (300) settles the charge on behalf of the Merchant (100) with the Processor (400) or directly with the Card Network (500).

8. The Card Network (500) causes the funds to be paid by the Card Issuing Bank (600) to Stripe (300) or to Stripe's Acquiring Bank (700).

9. Stripe (300) causes the settled funds to be sent to the Service Provider (100) (or to the Merchant's Bank (800)), net of any applicable fees.

10A. The Card Issuing Bank (600) collects the paid funds from the Customer (200).

Embodiments of the present invention may be operational with numerous general-purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, programmable consumer electronics, network PCs, minicomputers, mainframe computers, distributed computing environments that include any of the above-mentioned systems or devices, and the like.

Embodiments of the present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in association with local and/or remote computer storage media including, by way of example only, memory storage devices.

Overview of Invoice Numbering

Methods and apparatuses for invoice numbering are described. In one embodiment, the invoice numbering occurs automatically as part of the process of electronically generating invoices (e.g., software generated invoices). In one embodiment, the process of generating an invoice includes gaining access to one or more databases, retrieving information from these databases for the invoice, creating the invoice with or based on the retrieved data, including generating an invoice number, and persisting the invoice into the database. In one embodiment, the numbering of the invoice occurs with a single database write.

In one embodiment, the database contains a unique index of invoice number information. In one embodiment, the index includes an alphanumeric prefix chosen by the merchant to represent one or more of its customers, a numeric suffix representing the position of the invoice in the sequence of invoices sent to that (those) customer(s), and a unique identifier of the merchant itself. In alternative embodiments, the alphanumeric prefix is not chosen by the merchant and is assigned for the merchant. In alternative embodiments, the alphanumeric prefix is for a party that is not a merchant and is either chosen by or assigned to that party.

In one embodiment, to ensure that that the invoice numbers are assigned without any gaps between invoice numbers and without duplicate numbers, the payment processing system does not attempt to assign an invoice number unless it is guaranteed that the immediately preceding invoice number already exists in the database (or none does). For example, invoice number 005 is not assigned until it is guaranteed that an invoice with number 004 is already in the database.

In one embodiment, to ensure that that the invoice numbers are assigned without any gaps between invoice numbers and without duplicate numbers, the computer process that is about to assign an invoice number will take out a short lock on the database. In one embodiment, the length of the lock is as short as possible (e.g., 1 second or less). While the process holds the lock, it is the only process on any machine that is able/allowed to write an invoice number to the database for a given customer/merchant combination. In one embodiment, a different lock is used for each numbering scheme. If a merchant has enabled customer-level numbering, then the numbering lock is specific to the merchant's customers: e.g., one process per customer per merchant is allowed to write an invoice number to the database at a time. This means that Customer A and Customer B (each belonging to merchant X) can each have invoices created for them at the same time, however, only one invoice may be created at a time for Customer A. If one process is numbering an invoice for Customer A, no other process is allowed to do so. Alternatively, if the merchant has selected merchant-level numbering, then the numbering lock will be specific to the merchant alone: e.g., only one process will be allowed to write an invoice number to the database across all of the merchant's customers. This means that if one process is trying to number an invoice for Customer A at the same time as another is trying to number an invoice for Customer B, then the lock will force the processes to execute sequentially: one after the other. The lock that is taken out is as short as possible to prevent runaway processes: e.g., a situation in which there are many processes all attempting to write a number to the database simultaneously, and the process which holds the lock has an error that causes it to take a very long time. If lock lengths are not kept very brief, a runaway process that held the lock could cause all of the other processes to wait, severely impacting system performance. If the lock length is brief, however, the amount of time that a runaway process can delay all of the others is minimized. In such a scenario, after the initial lock expires, the next process is given the lock and is allowed to proceed to write to the database.

The use of a unique database index is also important in the case of runaway processes. It is possible that a runaway process could expire its lock without crashing, and then continue execution. In such a scenario the process might have incorrect information still stored in memory, e.g. about the highest invoice number in the database, and would accordingly attempt to persist a duplicate number to the database. Having a unique index in the database prevents runaway processes from creating duplicate numbers.

In one embodiment, invoices are optionally given a unique duplicate number key, which allows them to temporarily bypass the database-enforced uniqueness on invoice numbers. This is accomplished by adding the duplicate number key to the unique index. When the duplicate number key is set on an invoice, it forces the entry in the database index to be unique for the invoice, no matter what its number is. This key is useful for avoiding index collisions in the database before the invoice is finalized and has a number. This is the case for draft invoices, which may not have a number until they are finalized by the merchant. In one embodiment, at the time of finalization, the duplicate number key is removed so that no future invoice can have the same number.

In one embodiment, the apparatus comprises a payment processing system to process a transaction involving a merchant, a customer and a payment processor, where the system has a network interface configured to receive a request to prepare an invoice for a party (e.g., a merchant) a memory to store instructions, and one or more processors coupled to the memory and the network interface to execute the stored instructions to: prepare the invoice, including calling a command to assign an invoice number to the invoice; acquire a limited-time lock to cause any other requests to the database related to obtaining invoice numbers for invoices for the party to wait until the invoice number has been assigned and persisting the invoice to the database has completed; assign the invoice number to the invoice after confirming the highest invoice number already stored in the database, where the invoice number assigned is sequential to the highest invoice number; persist the invoice with the assigned invoice number to the database after assigning a number to the invoice; and release the lock in response to completely persisting the invoice with the assigned invoice number to the database, thereby freeing other processes to write invoice numbers.

Figure 2:
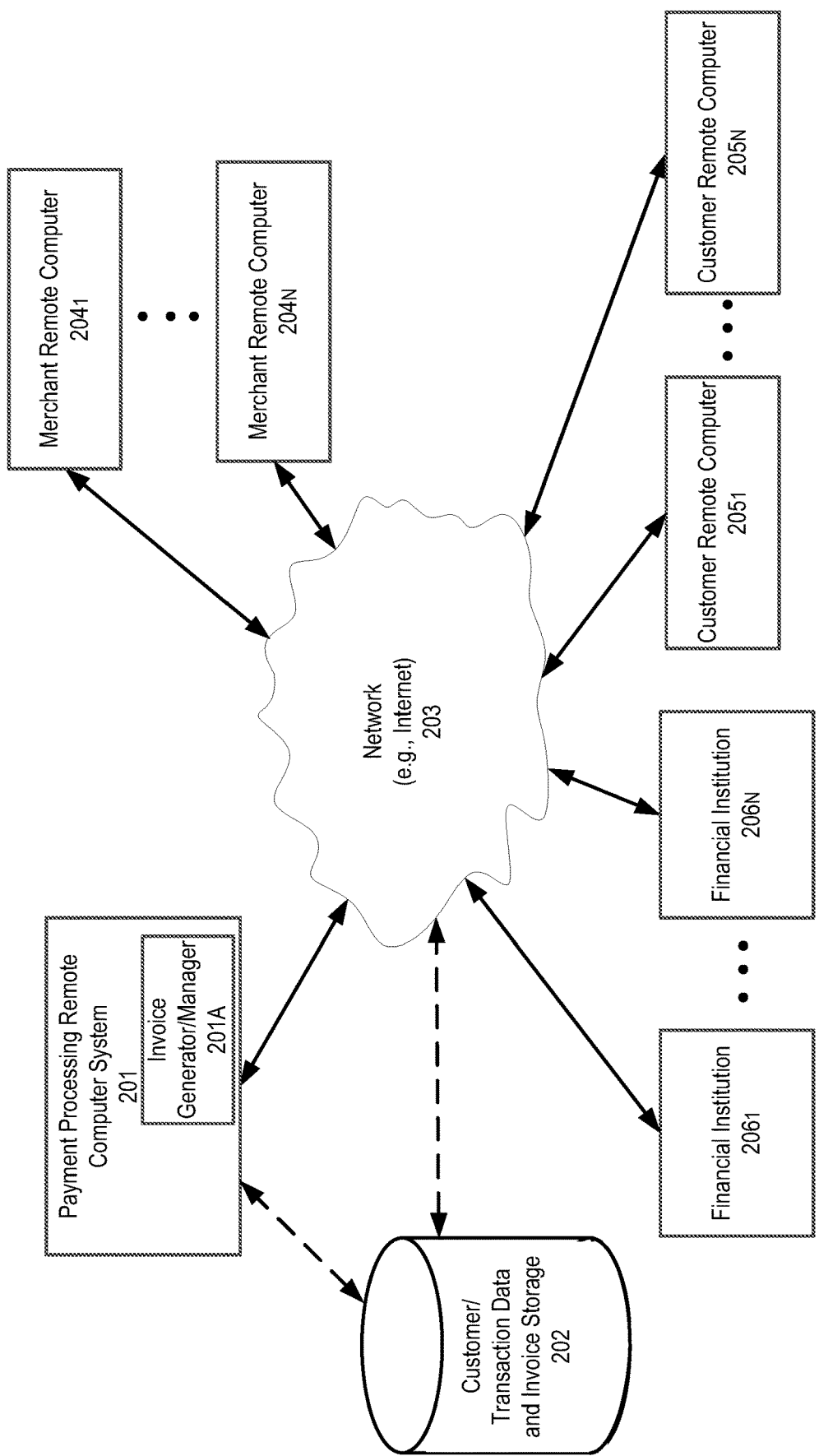
FIG. 2 shows a schematic diagram of a system in accordance with one or more embodiments of the invention.

FIG. 2 shows a schematic diagram of a system in accordance with one or more embodiments of the invention. As shown in FIG. 2, the system includes merchant computing devices (e.g., merchant remote computer devices $204_{1-N}$), customer computing devices (e.g., customer computing device $205_{1-N}$), financial institution computing devices (e.g., financial institution computer devices $206_{1-N}$), and commerce platform computing device (e.g., payment processing remote computer system 201). Each of these components is described below.

The merchant computing devices, customer computing devices, and financial institution computing devices may be connected via a computing network 203. The computing network 203 is any interconnection of computing devices. For example, the computing network 203 may be a local area network, a wide area network, mobile network, any other network, or a combination thereof. The financial institution computing devices may be connected via a monetary transaction network (not shown), which is an interconnection of financial institutions that perform the transfer of money between institutions. In other words, the monetary transaction network may include various complementary financial accounts at the financial institutions and a secured network to transmit instructions for debiting and crediting the financial accounts. Further, the various computing devices may be a computing device shown and described with respect to FIG. 6.

The various computing devices may include functionality to connect to the commerce platform 201 via the computing network 203. Specifically, the computing device may execute an application or may be remotely connected to the commerce platform 201, which may be a web application in such embodiments. The application may be configured to manage commerce transactions. A financial transaction is an exchange of a product for money. The commerce transaction may span a period of time, may involve multiple payments, and/or may involve multiple distributions of the product. Further, the commerce transaction may involve more than one product. A commerce transaction involves at least one product transaction and at least one monetary transaction. A product transaction is a movement of a product from one party to another party as specified by the commerce transaction. For example, the product transaction is the performance of the service or the delivery of goods. A monetary transaction is a movement of money from one party to another party for the commerce transaction. For example, the monetary transaction is the changing account balances in banks according to the ACH or credit network.

In one or more embodiments, the various computing devices are configured each to perform various tasks at the request of a remote computing device through an application programming interface. The application programming interface (API) is a set of programming instructions, protocols and standards for interacting with a software application. For example, a financial institution releases its API to a software company so that the software developers of the software company can design products that are capable of accessing the financial institution services.

Continuing with FIG. 2, the payment processing system of commerce platform 201 includes an invoice accounting system invoice generator/manager 201A that is responsible for generating, processing and sending invoices. In one embodiment, the invoice generation and management is part of a payment processing system. Such as system may be supported by separate virtual or physical servers. For example, an accounting system may operate on one or more virtual machine while the payment system operates on one or more different virtual machines that are on the same or different server(s). The various systems may have different storage structures, and software tools with varying programming languages and APIs that are specific to the functions of the corresponding system.

In one embodiment, invoice generator/manager 201A may accept payment initiations from customers, manage and track invoices, perform payroll functions, manage and pay bills, and generate accounting reports and perform other such actions. To perform such functions, the invoice generator/manager 201A may use a data repository, which may be local or remote, and is any type of storage unit and/or device (e.g., a file system, database, collection of tables, or any other storage mechanism) for storing data. In one embodiment, the data repository may include multiple different storage units and/or devices. The multiple different storage units and/or devices may or may not be of the same type or located at the same physical site. The data repository includes functionality to store invoices.

An invoice is an itemized statement specifying the terms of the commerce transaction. In one or more embodiments, the commerce transaction may be in progress. In particular, the invoice may itemize the products being sold, identify the customer and the vendor, and include payment terms. Specifically, the invoice specifies the payment details of an exchange of at least one product between the vendor and customer. The payment terms in the invoice may include the time period to pay the bill, the amount to pay, forms of acceptable payment, late fees, etc.

In one embodiment, the invoice generator/manager 201A is configured to manage the invoices for the merchant. In particular, the invoice generator/manager 201A includes functionality to generate invoices, update the status of the invoices, send invoices to customers, and receive initiations of payments from customers. In one or more embodiments, the invoice generator/manager 201A may communicate only indirectly with the customer through the customer system.

While FIG. 2 shows a configuration of components, other configurations may be used without departing from the scope of the invention. For example, various components may be combined to create a single component. As another example, the functionality performed by a single component may be performed by two or more components.

Figure 3:
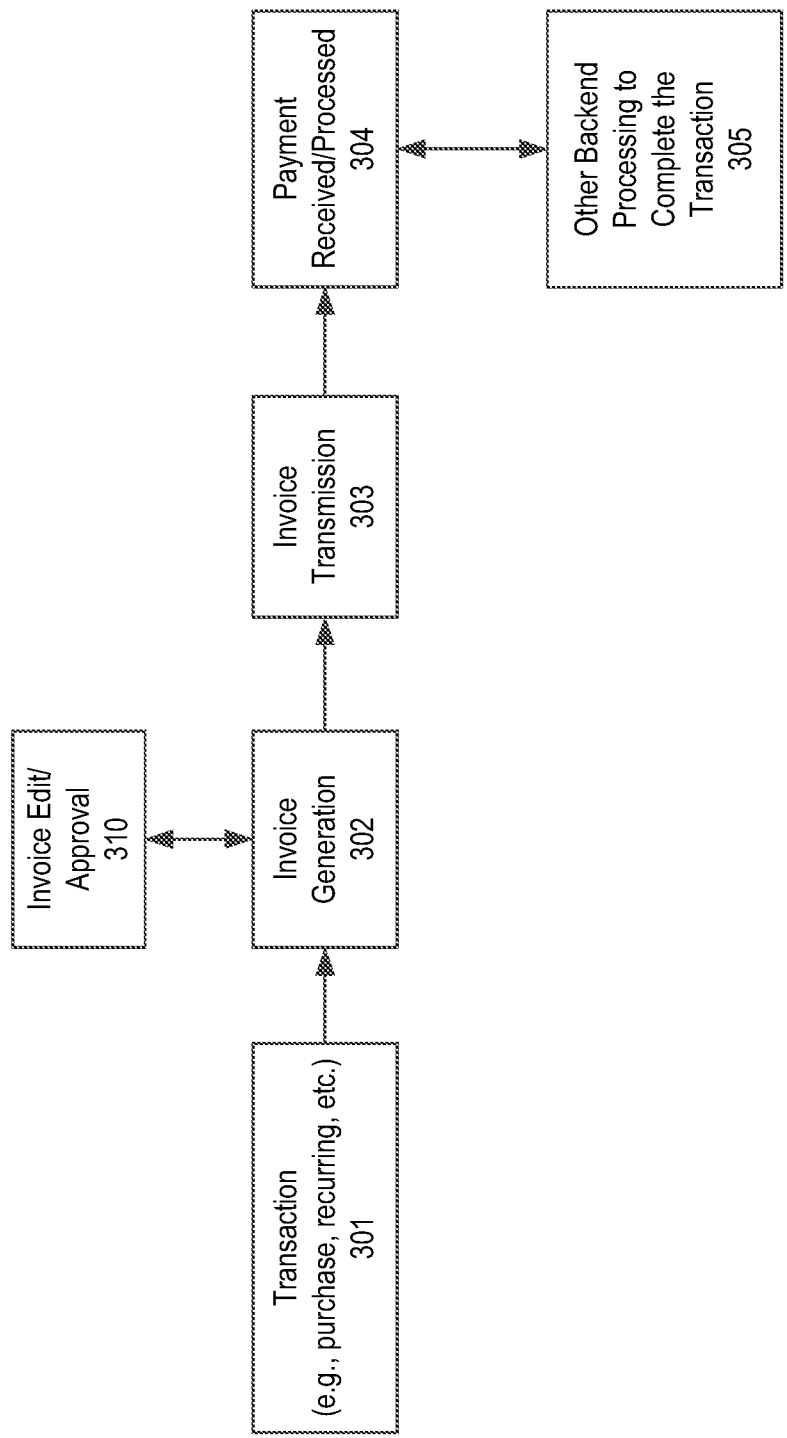
FIG. 3 is a data flow diagram of one embodiment of a process for handling a transaction with an invoice with a payment processor.

FIG. 3 is a data flow diagram of one embodiment of a process for handling a transaction with an invoice with a payment processor. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the operations in the process are performed by a payment processing system. While the payment processing system is shown as one system, in one embodiment, the payment processing system is implemented with more than one system (e.g., a plurality of processing devices, servers, computer systems, etc.).

Referring to FIG. 3, the process begins with the occurrence of a transaction (301). As discussed herein, the transaction may be one of many types including, but not limited to, a purchase of a product or service, a recurring transaction, etc. As part of the transaction, the payment processing system generates an invoice (302). The invoice may be sent by the payment processing system on behalf of a merchant. The payment processing system may send the generated invoice to the merchant for editing and/or approval (310). After any necessary editing and approval, the payment processing system transmits the generated invoice to a customer (303). In one embodiment, the transmission is an electronically transmitted communication over a network (e.g., the Internet).

Subsequently, and in response to the invoice, the payment processing system receives and processes the payment (304) and then performs one or more other operations in the backend to complete the transaction (305). The backend operations may include one or more of changing the invoice status to paid, though the payment processor may change the invoice status before, during, or after the actual monetary transaction for the payment is performed. Additionally, the payment processor may log a transaction update as a transaction record.

Invoice Generation

In one embodiment, the invoice generation logic of the payment processing system generates an invoice for a merchant using a series of operations. In one embodiment, the invoices are generated automatically as software generated invoices. In one embodiment, when invoices are created, they are given numbers that include two parts, a suffix and a prefix. For example, an invoice number may be assigned such as ABC-0001. The first portion, namely ABC in this example, is referred to herein as the prefix and may be specific to the customer that the invoice is sent to, while the second part, namely 0001 in this example, is referred to herein as the suffix and represents the sequential number of the invoice relative to the prefix for the merchant. For example, an invoice with the number ABC-0002 would come after an invoice with the number ABC-0001. In one embodiment, in order to find the largest invoice number issued for a given prefix, a query is made to the database to find the largest invoice suffix issued by a given merchant for a given prefix using the unique index as its index.

In one embodiment, the invoice generation logic assigns invoice numbers that satisfy tax compliance for some jurisdictions for individual merchants. More specifically, for tax compliance reasons, in one embodiment, the invoice generation logic assigns numbers so that they are:

1) sequential and without unintended gaps. In this case, if the last invoice received number ABC-0004, then the next invoice should receive ABC-0005, as opposed to ABC-0006;
2) unique (not duplicates). In this case, if one invoice is assigned number ABC-0002, then no other invoice for that merchant is assigned invoice number ABC-0002; and
3) permanent. In this case, if a finalized invoice has ABC-0002 today, it must always have that number in the future.

In one embodiment, the above characteristics are achieved when numbering invoices with a single database write. To do this, a unique index is added to an invoice model, which encapsulates the code that obtains the information from the database and operates on the data to create the invoice with the invoice numbers assigned as described above.

By having the unique index directly on the invoice model, the database cannot write duplicate invoice numbers to storage (e.g., disc). With respect to the problem of unintended gaps, these are prevented with invoice generation logic. Specifically, in one embodiment, the logic only increments an invoice number if (a) it holds the lock, and thus has a guarantee that no other process is persisting an invoice number at the same time, (b) while holding the lock it has confirmed what the highest number in the database is (either via a query, or a duplicate key exception), and (c) it only ever assigns the next number from one that is guaranteed to be in the database, thereby preventing a gap between invoice numbers from occurring.

Below is one embodiment of the logic to eliminate the possibility of gaps. Note that in one embodiment it's engineered to keep the retry loop as short as possible. This helps to ensure it doesn't lead to throughput issues.

```
LOCK_NAME = ' invoice_numbering '
MERCHANT_LEVEL = ' account_level '
CUSTOMER_LEVEL = ' customer_level '
FALLBACK_REQUESTED_SUFFIX = 1
MIN_DB _LOCK_TIME = 1 # 1 second
def call (
  invoice: ,
  customer: ,
  invoice_settings: ,
  numbering_scheme: nil,
  attempts: 1,
  save_opts: nil,
  force_number: false
)
  numbering_scheme || = get_numbering_scheme (customer)
  if attempts == 1 # only prepare the invoice once
    invoice = prepare_invoice_for_numbering (invoice, customer)
  end
  begin
    # The lock token will differ based on whether
    or not the merchant is
    # doing merchant-level or customer-
    level numbering. Explanation below.
    lock_token = determine_lock_token
    (customer, numbering_scheme)
    # We take out the lock to avoid slamming
    the DB with requests we know
    # will fail. Under normal circumstances
    this lock should only be held
    # ~3ms (1ms for for the read, 2ms for the write)
    Chalk: :ODM: :Locking.with_lock (
      LOCK_NAME,
      Lock_token,
      preempt_time: MIN_DB_LOCK_TIME
    ) do
      # load the number from the DB
      number_to_be_assigned = number_to_assign (
        invoice,
        customer,
        invoice_settings,
        numbering_scheme,
        invoice.livemode
      )
      # assign the number in memory
      invoice.number = number_to_be_assigned
      # save the number to the DB
      invoice.save
    end
    # at this point the lock has been released and
    freed up for another
    # process
  # catch attempts to save duplicate numbers
  thrown by our unique index
  rescue DuplicateKeyErrorForInvoiceNumbers => error
    if attempts >= 100 # avoid infinite loops
      Error.hard ("Exceeded max attempts
      to assign invoice number")
    end
    invoice.number = nil # we need to try a new number
    # recurse and try to number the invoice again
    return self.class.call (
      invoice: invoice,
      customer: customer,
      invoice_settings: invoice_settings,
      numbering_scheme: numbering_scheme,
      attempts: attempts + 1,
      force_number: force_number,
    )
  end
  invoice
end
# determines what numbering scheme the merchant has elected to use:
# MERCHANT_LEVEL or CUSTOMER_LEVEL
def get_numbering_scheme (customer)
  merchant = customer.merchant_
  merchant.invoice_settings.numbering_scheme
end
def prepare_invoice_for_numbering (invoice, customer)
  invoice.prefix = ComputeInvoicePrefix.call (customer: customer)
  invoice.duplicate_number = nil
  invoice
end
# Get the suffix/numeral that the merchant has told us they want they
# want on their next invoice, if applicable
def get_next_requested_suffix (
  customer,
  invoice_settings,
  numbering_scheme,
  livemode
)
  suffix = case numbering_scheme
  when CUSTOMER_ LEVEL
    customer.invoice_suffix_&.number || customer.invoice_number
  when MERCHANT _LEVEL
    if livemode
      invoice_settings&.suffix_livemode_&.number
    else
      invoice_settings&.suffix_testmode_&.number
    end
  end
```

-continued

```
    (suffix || FALLBACK_REQUESTED_SUFFIX) .to_i
  end
  # Determine what suffix to assign to the invoice. It is the greater of:
  # * the highest invoice suffix (for the merchant/
  customer) in the DB + 1,
  # or
  # * the requested next invoice suffix from the merchant
  def number_to_assign (
    invoice,
    customer,
    invoice_settings,
    numbering_scheme,
    livemode
  )
    requested_suffix = get_next_requested_suffix (
      customer,
      invoice_settings,
      numbering_scheme,
      livemode,
    )
    highest_number_in_db = read_highest_number_in_db (
      invoice.merchant,
      invoice.livemode,
      invoice.prefix,
    )
    next_available_in_db = highest_number_in_db + 1
    [next_available_in_db, requested_suffix] .max
  end
  # If a merchant is doing MERCHANT_LEVEL invoicing,
  then all of its invoices
  # have the same prefix even for different customers.
  If a merchant is doing
  # CUSTOMER_LEVEL invoicing, then all
  of the invoices for a given customer
  # have the same prefix. Hence, querying by
  merchant and prefix allows us to
  # find the highest relevant invoice number in the DB.
  def read_highest_number_in_db (merchant_token, livemode, prefix)
    # we reverse-sort by number, so the first is the largest
    Model: :Invoice.query_by ( :numbered_invoices_
    with_prefix) .load_one (
      merchant: merchant_token,
      livemode: livemode,
      prefix: prefix,
    ) &.number || 0
  end
  # We use a different lock depending on the
  numbering scheme. This is because
  # there are different uniqueness constraints
  for the different schemes. On
  # CUSTOMER_LEVEL, two customers can
  be invoiced at the same time because
  # their numbers don't impact each other. So
  there is no need for the two
  # processes issuing those numbers to execute sequentially. On
  # MERCHANT_LEVEL, however, customers
  must be invoiced sequentially because
  # the number given to one affects the number that will be given to the
  # other. So processes executing simultaneously
  must be forced to queue up.
  def determine_lock_token (customer, numbering_scheme)
    case numbering_scheme
    when CUSTOMER_LEVEL then customer.token
    when MERCHANT_LEVEL then "# { customer.merchant } -#
    { customer.livemode }"
    end
  end
```

Using the techniques disclosed here, the payment processing system is able to perform merchant- and customer-level numbering. More specifically, because invoice prefixes are unique across a merchant in accordance with one embodiment, it is not possible for a customer-level index entry to collide with a merchant-level index as they necessarily must differ with respect to their prefix values. Otherwise, they are treated exactly the same.

In one embodiment, by using a lock and a duplicate key exception, invoice numbers assigned using the indexing scheme described above are able to result in the issuance of invoice numbers sequentially either across the merchant and/or a merchant's customer without duplicates and without gaps. More specifically, in one embodiment, when a request for an invoice, and the corresponding assignment of an invoice number, occurs, the invoice generation logic obtains a lock that prevents other requests for the generation of an invoice with an invoice number from being persisted to the database at the same time. During the lock, the invoice generation logic is able to call a command to the database to assign an invoice number to the invoice. The execution of the command causes a read from the database to determine the last (or highest) invoice number that was assigned and persisted to the database and a determination of the next sequential invoice number (based on the retrieved last invoice number). In one embodiment, the invoice number is generated with the index as described above. Also, during the lock, the invoice, along with its invoice number, is persisted to the database via a write operation. Thus, during the lock, the assignment of an invoice number occurs during the single database write.

The use of the lock prevents other similar requests for the assignment of invoice numbers that occur at the same time from causing duplicate invoice numbers. This is particularly important when the number of requests for invoice numbers (e.g., thousands and thousands) occur simultaneously, i.e., overlap in time, such as in the case, for example, but not limited to, recurring or subscription payments. When this occurs and a lock has been used in response to the first request for the assignment of an invoice number for one invoice, all other requests that occur at the same time are queued while the invoice number assignment and persisting of data to the database associated with the first request is handled. After the invoice associated with the first request gets an invoice number, the lock is released and next request for an invoice number in the queue gets to utilize a lock (and the process is repeated).

It is possible for one or more reasons (e.g., a database connection issue, a random error, etc.) that an invoice number for an invoice is not assigned by the time a lock expires. In such a situation, if another request for the assignment of an invoice number was waiting in the queue, then two requests may have read the highest previously issued invoice number and then end up with the same invoice number. However, in this situation, only one of the two invoices will be successfully written to the database. This may be the result of the previously queued invoice number request will obtain the lock, thereby preventing the invoice with the first request from being persisted to the database. In one case, when an attempt is made to persist the invoice for the first request to the database, a duplicate key exception (error) is generated. The results of the duplicate key exception is that the invoice associated with the first request is not persisted to the database and its request will be subsequently retried in the future. In one embodiment, the request is retried because it is recursive (i.e., it calls itself again). In one embodiment, in such a case, upon retry, the first request is place into the queue (e.g., placed at the end of the queue, placed at some location in the middle of the queue, placed at the front of the queue immediately following the request that obtained the lock and prevented its invoice from being persisted to the database, etc.).

Note that in one embodiment, the lock that is used is only applicable to prevent competing requests for assigning invoice numbers. Therefore, requests to persist data to the database for operations other than assigning invoice numbers are not prevented from completing while the lock is place.

Figure 4:
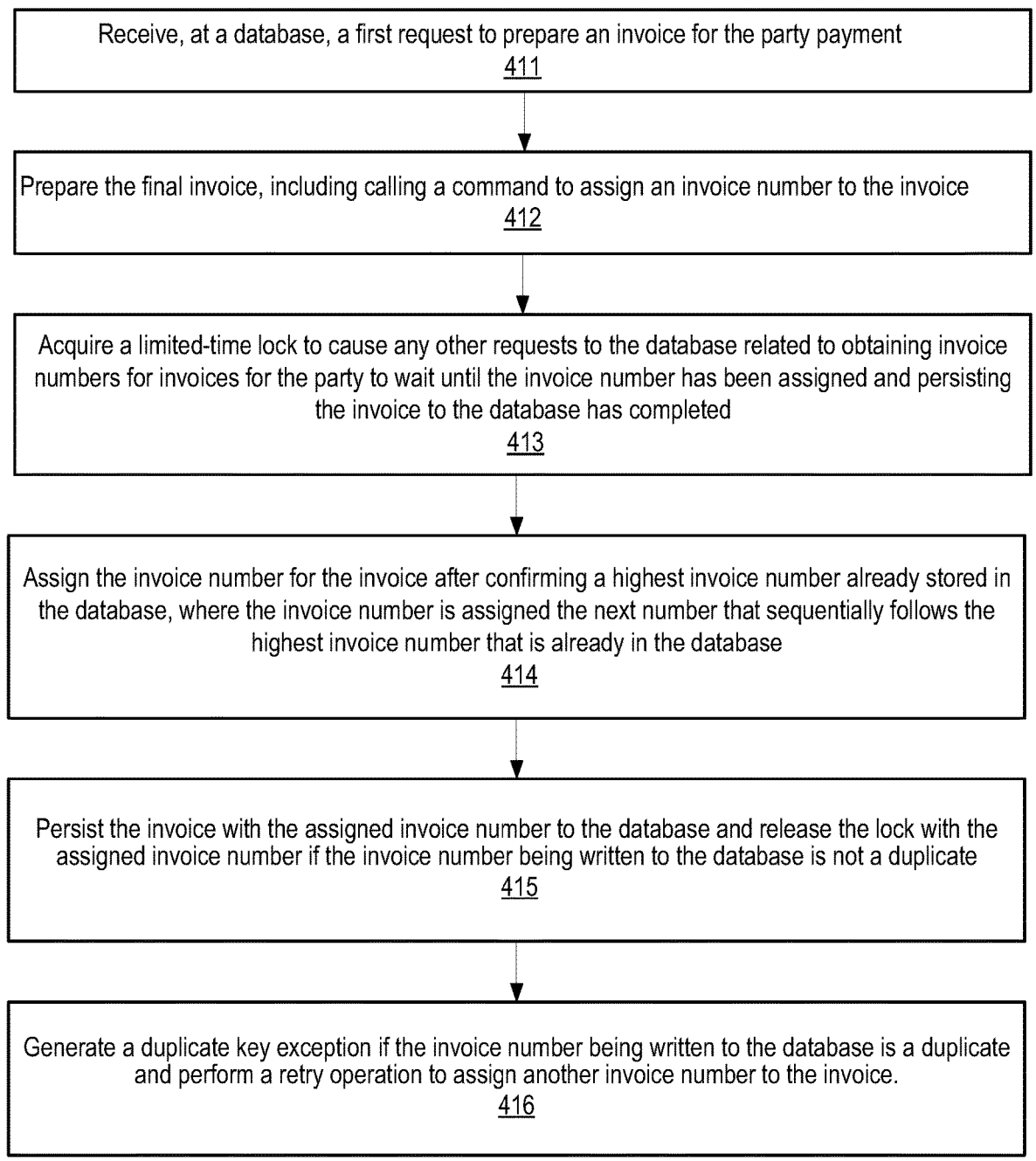
FIG. 4 is a flow diagram of an embodiment of a process for generating an invoice.

FIG. 4 is a flow diagram of an embodiment of a process for generating an invoice using a lock. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the operations in the process are performed by a payment processing system. While the payment processing system is shown as one system, in one embodiment, the payment processing system is implemented with more than one system (e.g., a plurality of processing devices, servers, computer systems, etc.).

Referring to FIG. 4, the process begins by processing logic receiving, at a database, a first request to prepare an invoice for the party (e.g., a merchant, etc.) (processing block 411).

In response to the request, processing logic prepares the invoice, including calling a command to assign an invoice number to the invoice (processing block 412).

As part of completing the invoice, processing logic acquires a limited-time lock to cause any other requests to the database related to obtaining invoice numbers for invoices for the party to wait until the invoice number has been assigned and persisting the invoice to the database has completed (processing block 413) and then assigns the invoice number for the invoice after confirming a highest invoice number already stored in the database (processing block 414). In one embodiment, the invoice number comprises an index with an index prefix for the invoice number that identifies the party and an index suffix representing the next number sequentially to the highest invoice number that is already in the database.

After assigning a number to the invoice, processing logic persists the invoice with the assigned invoice number to the database and releases the lock (processing block 415). In one embodiment, this is in response to completely persisting the invoice with the assigned invoice number to the database if the invoice number being written to the database is not a duplicate In one embodiment, processing logic generates a duplicate key exception (error) in response to an indication that the invoice number being written to the database is a duplicate, or otherwise already exists in the database for an invoice of the party (and their customer) and performs a retry operation to assign another invoice number to the invoice (processing block 416).

As discussed above, in one embodiment, invoices may be initially issued in draft form and subsequently finalized after the merchant performs any edits, if necessary, and/or approvals of the invoice. The edits may take an indeterminant amount of time, and during that time, the invoice remains in a draft state. When this occurs, each of the draft invoices receives a duplicate number key while in the draft state. In one embodiment, the duplicate number key is a number (e.g., a randomly generated string of numbers) that causes or otherwise prevents the invoice from being assigned an invoice number that will be persisted to the database until its being written into the database during the single database write. In one embodiment, the duplicate number key is added to the index, and when the duplicate number key is set on the invoice, it forces the entry in the database index to be unique for the invoice. Note that in one embodiment, all draft invoices appear to the database to have the same number, which causes the database to allow the invoice while preventing it from being persisted.

The use of the duplicate number key prevents duplicate invoice numbers from being generated because an invoice number is not issued until an invoice has been finalized and is ready for transmission to a customer. This also prevents gaps because even if an invoice is subsequently cancelled, it never received an official invoice number that was persisted to the database.

When the invoice has been finalized and a real invoice number is going to be written to the invoice, then the duplicate number key is removed. Thus, at this point, when the duplicate number field is empty or blank, the final invoice and its assigned real invoice number are persisted to the database.

Figure 5:
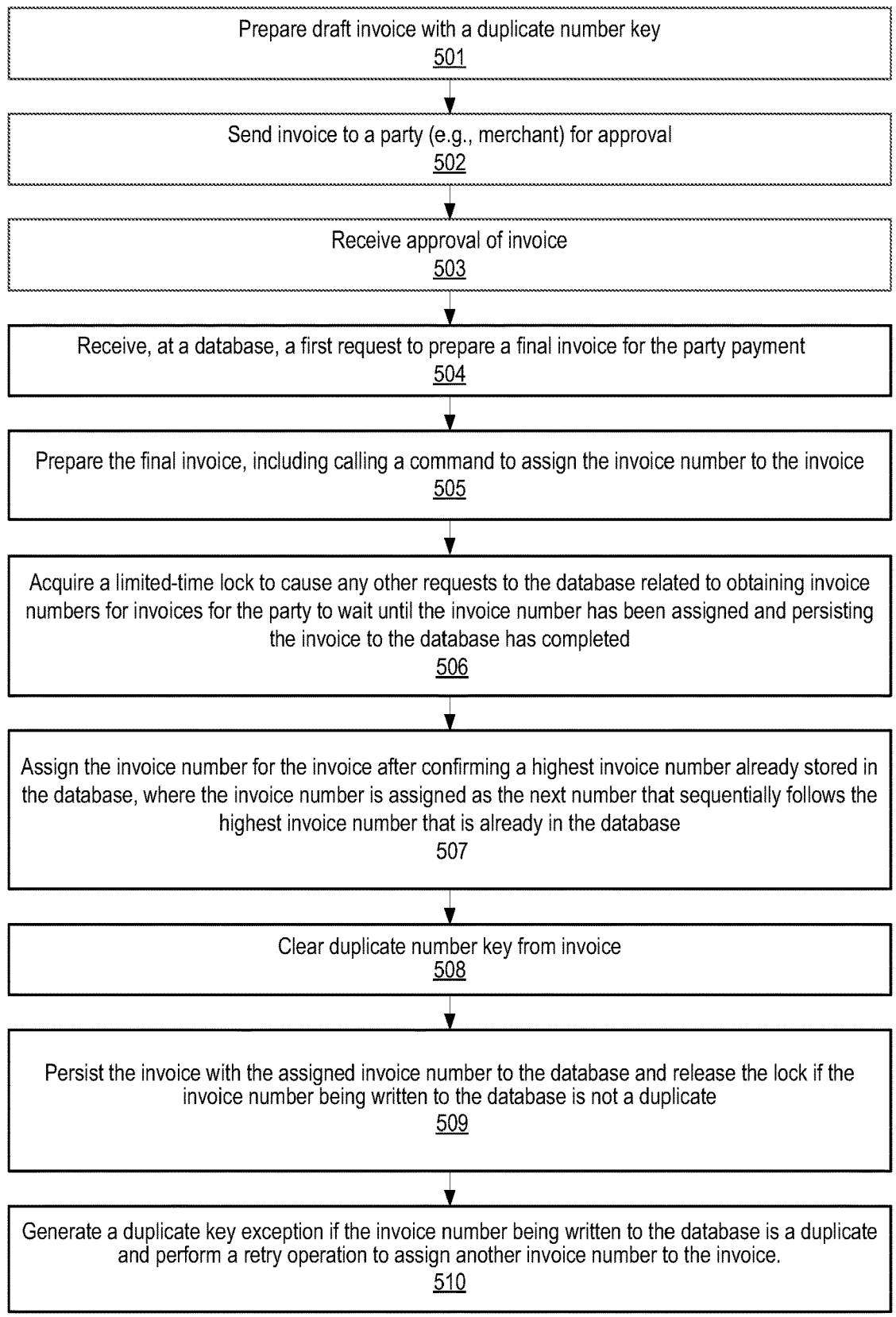
FIG. 5 is a flow diagram of another embodiment of a process for generating an invoice.

FIG. 5 is a flow diagram of another embodiment of a process for generating an invoice when draft invoices are involved. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the operations in the process are performed by a payment processing system. While the payment processing system is shown as one system, in one embodiment, the payment processing system is implemented with more than one system (e.g., a plurality of processing devices, servers, computer systems, etc.).

Referring to FIG. 5, the process begins by processing logic preparing a draft invoice that contains a duplicate number key (processing block 501). In one embodiment, the duplicate number key is randomly generated and assigned to the draft invoice.

Once a draft invoice has been generated, processing logic sends the invoice to a party (e.g., merchant) for editing, if any, and then approval (processing block 502). In one embodiment, the invoice may be with the party for indeterminant amount of time while editing and the approval process occurs.

Subsequently, the invoice receives final approval (processing block 503) and processing logic receives a first request to prepare a final invoice for the party (e.g., a merchant, etc.) (processing block 504).

In response to the request, processing logic prepares the final invoice, including calling a command to assign an invoice number to the invoice (processing block 505).

As part of completing the invoice, processing logic acquires a limited-time lock to cause any other requests to the database related to obtaining invoice numbers for invoices for the party to wait until the invoice number has been assigned and persisting the invoice to the database has completed (processing block 506) and then assigns the invoice number for the invoice after confirming a highest invoice number already stored in the database (processing block 507). In one embodiment, the invoice number comprises an index with an index prefix for the invoice number that identifies the party and an index suffix representing the next number sequentially to the highest invoice number that is already in the database.

Processing logic also clears the duplication number key from the invoice (processing block 508).

After assigning a number to the invoice, processing logic persists the invoice with the assigned invoice number to the database and releases the lock (processing block 509). In one embodiment, this is in response to completely persisting the invoice with the assigned invoice number to the database if the invoice number being written to the database is not a duplicate In one embodiment, processing logic generates a duplicate key exception (error) in response to an indication that the invoice number being written to the database is a duplicate, or otherwise already exists in the database for an invoice of the party (and their customer) and performs a retry operation to assign another invoice number to the invoice (processing block 510).

An Example Computer System

Figure 6:
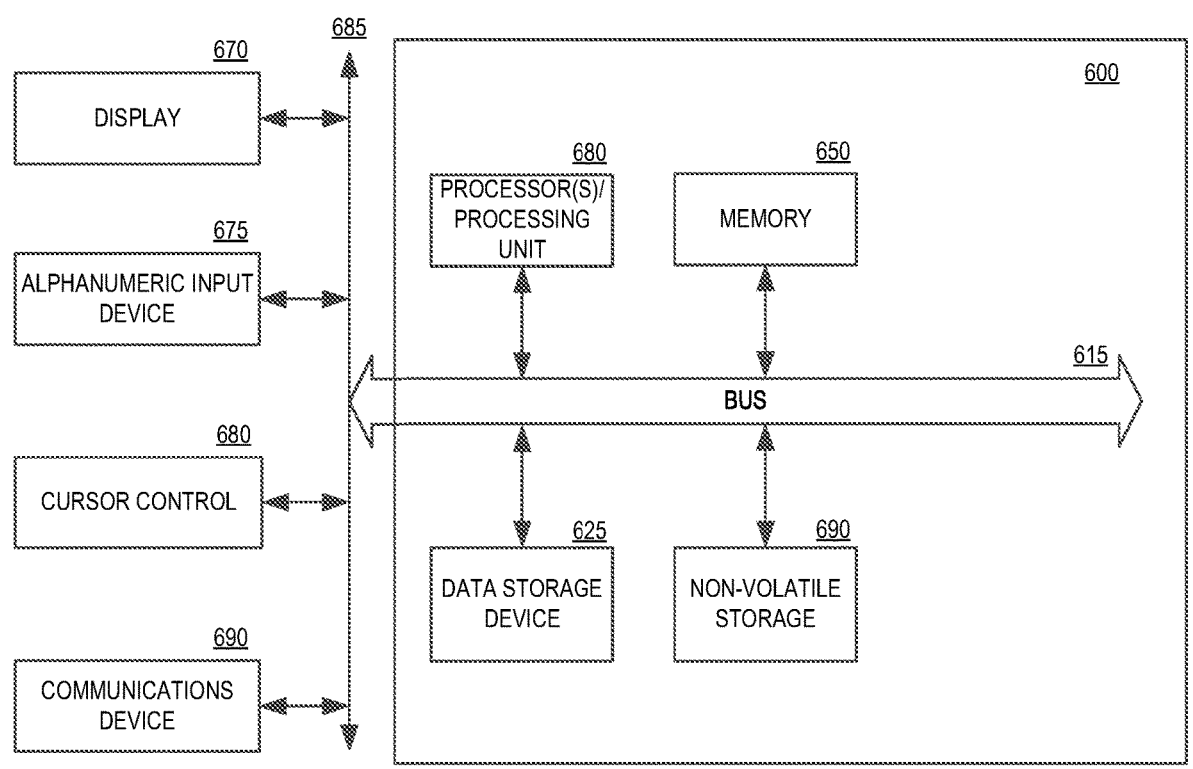
FIG. 6 is a block diagram of one embodiment of a computer system in accordance with one or more embodiments of the present invention.

FIG. 6 is one embodiment of a computer system that may be used to support the systems and operations discussed herein. It will be apparent to those of ordinary skill in the art, however that other alternative systems of various system architectures may also be used.

The data processing system illustrated in FIG. 6 includes a bus or other internal communication means 615 for communicating information, and a processor(s) 610 coupled to the bus 615 for processing information. The system further comprises a random-access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor(s) 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

In one embodiment, processor(s) 610 executes invoice generation logic and perform invoice numbering as described above, including handling database requests to prepare invoices, preparing invoices, acquiring, using and releasing locks, assigning invoice numbers, and persisting invoices, and using duplicate number keys.

the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 685, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need to be present for the device to function.

Figure 7:
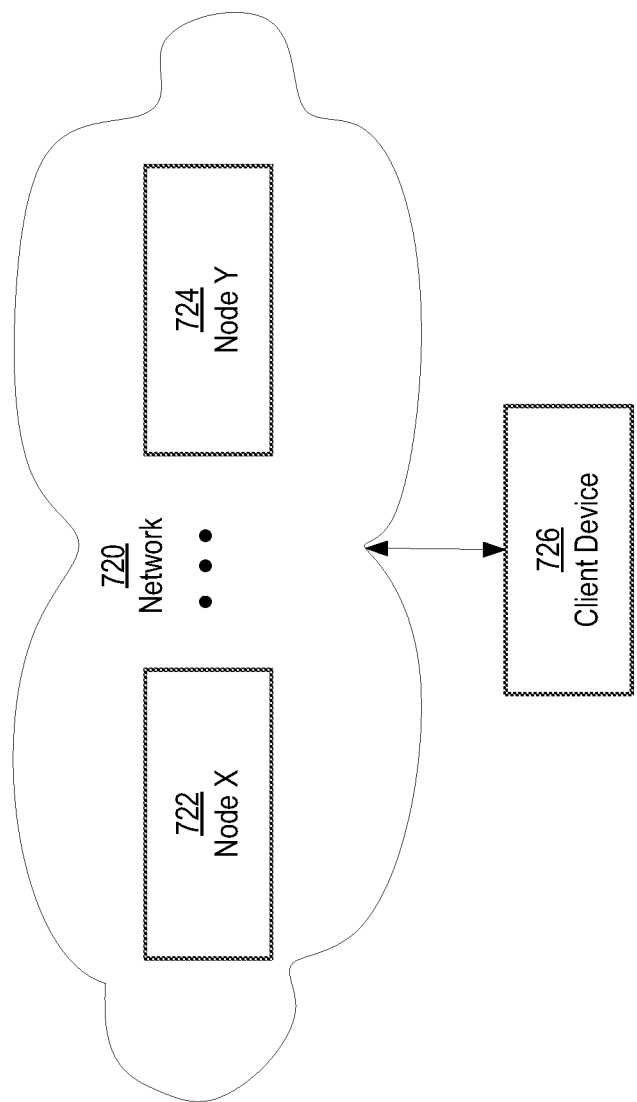
FIG. 7 is another block diagram of one embodiment of a computer system in accordance with one or more embodiments of the present invention.

The computing system in FIG. 6 may be connected to or be a part of a network. For example, as shown in FIG. 7, network 720 may include multiple nodes (e.g., node X 722, node Y 724)). Each node may correspond to a computing system, such as the computing system shown in FIG. 7, or a group of nodes combined may correspond to the computing system shown in FIG. 7. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the computing system 700 may be located at a remote location and connected to the other elements over a network.

Although not shown in FIG. 7, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 722, node Y 724) in network 720 may be configured to provide services for a client device 726. For example, the nodes may be part of a cloud computing system. The nodes may include functionality to receive requests from client device 726 and transmit responses to client device 726. Client device 726 may be a computing system, such as the computing system shown in FIG. 6. Further, client device 726 may include and/or perform all or a portion of one or more embodiments of the invention.

The computing system or group of computing systems described in FIGS. 7 and 7 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 6 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 6 and the nodes and/or client device in FIG. 7. Other functions may be performed using one or more embodiments of the invention.

There is a number of example embodiments described herein.

Example 1 is method for electronically generating invoices for a party with invoice numbers where there are no gaps between invoice numbers nor duplicate invoice numbers, the method comprising: receiving, at a database, a first request to prepare an invoice for the party; preparing the invoice, including calling a command to assign an invoice number to the invoice; acquiring a limited-time lock to cause any other requests to the database related to obtaining invoice numbers for invoices for the party to wait until the invoice number has been assigned and persisting the invoice to the database has completed; assigning the invoice number for the invoice after confirming a highest invoice number already stored in the database, the invoice number being next sequentially to the highest invoice number; after assigning a number to the invoice, then persisting the invoice with the assigned invoice number to the database; and releasing the lock in response to completely persisting the invoice with the assigned invoice number to the database.

Example 2 is method of example 1 that may optionally include generating a duplicate key exception in response to an indication that the invoice number being written to the database is a duplicate; and performing a retry operation to assign another invoice number to the invoice.

Example 3 is method of example 1 that may optionally include that generating the duplicate key exception occurs after the lock has expired without the invoice with the assigned invoice number to the database being persisted to the database which enables a second request to prepare another invoice for the party to occur simultaneously to a retry of the first request with both the first and second requests causing invoices to be generated having identical invoice numbers.

Example 4 is method of example 1 that may optionally include creating a draft of the invoice prior to receiving the first request, including adding a duplicate number key to the invoice number, the database not determining whether to generate a duplicate key exception for any invoice with a duplicate number key; and clearing the duplicate number key for the invoice prior to persisting the invoice with the assigned number to the database.

Example 5 is method of example 1 that may optionally include determining the invoice number for the invoice by generating an index with an index prefix for the invoice number that identifies the party and an index suffix for the invoice number.

Example 6 is method of example 1 that may optionally include that the invoice number is assigned sequentially across a customer of the party.

Example 7 is method of example 1 that may optionally include that the invoice number is assigned sequentially across a customer of the party.

Example 8 is method of example 1 that may optionally include that the request is responsive to an invoice model that represents the invoice in the database, the invoice model including code to operate on information in the database and request an invoice number for the invoice from the database.

Example 9 is a payment processing system to process a transaction involving a merchant, a customer and a payment processor, the system comprising: a network interface configured to receive a first request to prepare an invoice for a party; a memory to store instructions; and one or more processors coupled to the memory and the network interface to execute the stored instructions to: prepare the invoice, including calling a command to assign an invoice number to the invoice; acquire a limited-time lock to cause any other requests to the database related to obtaining invoice numbers for invoices for the party to wait until the invoice number has been assigned and persisting the invoice to the database has completed; assign the invoice number for the invoice after confirming a highest invoice number already stored in the database, the invoice number being next sequentially to the highest invoice number; after assigning a number to the invoice, then persist the invoice with the assigned invoice number to the database; and release the lock in response to completely persisting the invoice with the assigned invoice number to the database.

Example 10 is system of example 9 that may optionally include that the one or more processor are further configured to: generate a duplicate key exception in response to an indication that the invoice number being written to the database is a duplicate; and perform a retry operation to assign another invoice number to the invoice.

Example 11 is system of example 10 that may optionally include that the one or more processor are further configured to generate the duplicate key exception after the lock has expired without the invoice with the assigned invoice number to the database being persisted to the database which enables a second request to prepare another invoice for the party to occur simultaneously to a retry of the first request with both the first and second requests causing invoices to be generated having identical invoice numbers.

Example 12 is system of example 9 that may optionally include that the one or more processor are further configured to: create a draft of the invoice prior to receiving the first request, including adding a duplicate number key to the invoice number, the database not determining whether to generate a duplicate key exception for any invoice with a duplicate number key; and clear the duplicate number key for the invoice prior to persisting the invoice with the assigned number to the database.

Example 13 is system of example 9 that may optionally include that the one or more processor are further configured to determine the invoice number for the invoice by generating an index with an index prefix for the invoice number that identifies the party and an index suffix for the invoice number.

Example 14 is system of example 9 that may optionally include that the invoice number is assigned sequentially across a customer of the party.

Example 15 is system of example 9 that may optionally include that the invoice number is assigned sequentially across a customer of the party.

Example 16 is system of example 9 that may optionally include that the request is responsive to an invoice model that represents the invoice in the database, the invoice model including code to operate on information in the database and request an invoice number for the invoice from the database.

Example 17 is one or more non-transitory computer readable storage media having instructions stored thereupon which, when executed by a payment processing system having at least a processor and a memory therein, cause the payment processing system to perform operations comprising: receiving, at a database, a first request to prepare an invoice for the party; preparing the invoice, including calling a command to assign an invoice number to the invoice; acquiring a limited-time lock to cause any other requests to the database related to obtaining invoice numbers for invoices for the party to wait until the invoice number has been assigned and persisting the invoice to the database has completed; assigning the invoice number for the invoice after confirming a highest invoice number already stored in the database, the invoice number being next sequentially to the highest invoice number; after assigning a number to the invoice, then persisting the invoice with the assigned invoice number to the database; and releasing the lock in response to completely persisting the invoice with the assigned invoice number to the database.

Example 18 is media of example 17 that may optionally include that the operations further comprise: generating a duplicate key exception in response to an indication that the invoice number being written to the database is a duplicate; and performing a retry operation to assign another invoice number to the invoice.

Example 19 is media of example 18 that may optionally include that generating the duplicate key exception occurs after the lock has expired without the invoice with the assigned invoice number to the database being persisted to the database which enables a second request to prepare another invoice for the party to occur simultaneously to a retry of the first request with both the first and second requests causing invoices to be generated having identical invoice numbers.

Example 20 is media of example 17 that may optionally include that the operations further comprise: creating a draft of the invoice prior to receiving the first request, including adding a duplicate number key to the invoice number, the database not determining whether to generate a duplicate key exception for any invoice with a duplicate number key; and clearing the duplicate number key for the invoice prior to persisting the invoice with the assigned number to the database.

Example 21 is media of example 17 that may optionally include that the operations further comprise determining the invoice number for the invoice by generating an index with an index prefix for the invoice number that identifies the party and an index suffix for the invoice number.

Example 22 is media of example 17 that may optionally include that the request is responsive to an invoice model that represents the invoice in the database, the invoice model including code to operate on information in the database and request an invoice number for the invoice from the database.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for electronically generating invoices for a party with invoice numbers where there are no gaps between invoice numbers nor duplicate invoice numbers, the method comprising:
   receiving, at a database, a first request to prepare an invoice for the party;
   preparing the invoice, including calling a command to assign an invoice number to the invoice;
   selecting a limited-time lock from a set of selectable locks based on a type of invoicing being used for the party;
   acquiring the limited-time lock to cause any other requests to the database related to obtaining invoice numbers for invoices for the party to wait until the invoice number has been assigned and persisting the invoice to the database has completed, wherein the limited-time lock blocks any other competing requests to the database for assigning invoice numbers until a current request holding the limited-time lock has completed persisting to the database while allowing other requests for persisting data to the database other than assigning invoice numbers to complete while the lock is in place;
   assigning, during the lock, the invoice number for the invoice after confirming a highest invoice number already stored in the database, the invoice number being next sequentially to the highest invoice number;
   after assigning a number to the invoice and during the lock, then persisting the invoice with the assigned invoice number to the database; and
   releasing the lock in response to completely persisting the invoice with the assigned invoice number to the database.

2. The method defined in claim 1 further comprising:
   generating a duplicate key exception in response to an indication that the invoice number being written to the database is a duplicate; and
   performing a retry operation to assign another invoice number to the invoice.

3. The method defined in claim 2 wherein generating the duplicate key exception occurs after the lock has expired without the invoice with the assigned invoice number to the database being persisted to the database which enables a second request to prepare another invoice for the party to occur simultaneously to a retry of the first request with both the first and second requests causing invoices to be generated having identical invoice numbers.

4. The method defined in claim 1 further comprising:
   creating a draft of the invoice prior to receiving the first request, including adding a duplicate number key to the invoice number, the database not determining whether to generate a duplicate key exception for any invoice with a duplicate number key; and
   clearing the duplicate number key for the invoice prior to persisting the invoice with the assigned number to the database.

5. The method defined in claim 1 further comprising determining the invoice number for the invoice by generating an index with an index prefix for the invoice number that identifies the party and an index suffix for the invoice number.

6. The method defined in claim 1 wherein the invoice number is assigned sequentially across a customer of the party.

7. The method defined in claim 1 wherein the invoice number is assigned sequentially across all customers of the party.

8. The method defined in claim 1 wherein the request is responsive to an invoice model that represents the invoice in the database, the invoice model including code to operate on information in the database and request an invoice number for the invoice from the database.

9. The method of claim 1 wherein the set of selectable locks includes the limited-time lock when the type of invoicing is merchant-level invoicing and another type of lock, different from the limited-time lock, when the type of invoicing is customer-level invoicing.

10. A payment processing system to process a transaction involving a merchant, a customer and a payment processor, the system comprising:
    a network interface configured to receive a first request to prepare an invoice for a party;
    a memory to store instructions;
    one or more processors coupled to the memory and the network interface to execute the stored instructions to:
    prepare the invoice, including calling a command to assign an invoice number to the invoice;
    select a limited-time lock from a set of selectable locks based on a type of invoicing being used for the party;
    acquire the limited-time lock to cause any other requests to the database related to obtaining invoice numbers for invoices for the party to wait until the invoice number has been assigned and persisting the invoice to the database has completed, wherein the limited-time lock blocks any other competing requests to the database for assigning invoice numbers until a current request holding the limited-time lock has completed persisting to the database while allowing other requests for persisting data to the database other than assigning invoice numbers to complete while the lock is in place;
    assign, during the lock, the invoice number for the invoice after confirming a highest invoice number already stored in the database, the invoice number being next sequentially to the highest invoice number;
    after assigning a number to the invoice and during the lock, then persist the invoice with the assigned invoice number to the database; and release the lock in response to completely persisting the invoice with the assigned invoice number to the database.

11. The system defined in claim 10 wherein the one or more processors are further configured to:
generate a duplicate key exception in response to an indication that the invoice number being written to the database is a duplicate; and
perform a retry operation to assign another invoice number to the invoice.

12. The system defined in claim 11 wherein the one or more processors are further configured to generate the duplicate key exception after the lock has expired without the invoice with the assigned invoice number to the database being persisted to the database which enables a second request to prepare another invoice for the party to occur simultaneously to a retry of the first request with both the first and second requests causing invoices to be generated having identical invoice numbers.

13. The system defined in claim 10 wherein the one or more processors are further configured to:
create a draft of the invoice prior to receiving the first request, including adding a duplicate number key to the invoice number, the database not determining whether to generate a duplicate key exception for any invoice with a duplicate number key; and
clear the duplicate number key for the invoice prior to persisting the invoice with the assigned number to the database.

14. The system defined in claim 10 wherein the one or more processors are further configured to determine the invoice number for the invoice by generating an index with an index prefix for the invoice number that identifies the party and an index suffix for the invoice number.

15. The system defined in claim 10 wherein the invoice number is assigned sequentially across a customer of the party.

16. The system defined in claim 10 wherein the invoice number is assigned sequentially across all customers of the party.

17. The system defined in claim 10 wherein the request is responsive to an invoice model that represents the invoice in the database, the invoice model including code to operate on information in the database and request an invoice number for the invoice from the database.

18. One or more non-transitory computer readable storage media having instructions stored thereupon which, when executed by a payment processing system having at least a processor and a memory therein, cause the payment processing system to perform operations comprising:
receiving, at a database, a first request to prepare an invoice for the party;
preparing the invoice, including calling a command to assign an invoice number to the invoice;
selecting a limited-time lock from a set of selectable locks based on a type of invoicing being used for the party;
acquiring the limited-time lock to cause any other requests to the database related to obtaining invoice numbers for invoices for the party to wait until the invoice number has been assigned and persisting the invoice to the database has completed, wherein the limited-time lock blocks any other competing requests to the database for assigning invoice numbers until a current request holding the limited-time lock has completed persisting to the database while allowing other requests for persisting data to the database other than assigning invoice numbers to complete while the lock is in place;
assigning, during the lock, the invoice number for the invoice after confirming a highest invoice number already stored in the database, the invoice number being next sequentially to the highest invoice number;
after assigning a number to the invoice and during the lock, then persisting the invoice with the assigned invoice number to the database; and
releasing the lock in response to completely persisting the invoice with the assigned invoice number to the database.

19. The medium defined in claim 18 wherein the operations further comprise:
generating a duplicate key exception in response to an indication that the invoice number being written to the database is a duplicate; and
performing a retry operation to assign another invoice number to the invoice.

20. The medium defined in claim 19 wherein generating the duplicate key exception occurs after the lock has expired without the invoice with the assigned invoice number to the database being persisted to the database which enables a second request to prepare another invoice for the party to occur simultaneously to a retry of the first request with both the first and second requests causing invoices to be generated having identical invoice numbers.

21. The medium defined in claim 18 wherein the operations further comprise:
creating a draft of the invoice prior to receiving the first request, including adding a duplicate number key to the invoice number, the database not determining whether to generate a duplicate key exception for any invoice with a duplicate number key; and
clearing the duplicate number key for the invoice prior to persisting the invoice with the assigned number to the database.

22. The medium defined in claim 18 wherein the request is responsive to an invoice model that represents the invoice in the database, the invoice model including code to operate on information in the database and request an invoice number for the invoice from the database.

* * * * *